United States Patent
Furusawa et al.

(10) Patent No.: US 11,509,748 B2
(45) Date of Patent: Nov. 22, 2022

(54) HART MODEM AND DIAGNOSTIC SYSTEM

(71) Applicant: Azbil Corporation, Tokyo (JP)

(72) Inventors: Naoki Furusawa, Tokyo (JP); Mamoru Kagoura, Tokyo (JP); Naoyuki Fukao, Tokyo (JP); Hiroyuki Tsugane, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 134 days.

(21) Appl. No.: 17/094,073

(22) Filed: Nov. 10, 2020

(65) Prior Publication Data

US 2021/0144234 A1    May 13, 2021

(30) Foreign Application Priority Data

Nov. 13, 2019  (JP) .............................. JP2019-205321

(51) Int. Cl.
| | |
|---|---|
| *H04L 69/08* | (2022.01) |
| *G05B 19/042* | (2006.01) |
| *G08C 17/02* | (2006.01) |
| *H04W 4/38* | (2018.01) |

(52) U.S. Cl.
CPC .......... *H04L 69/08* (2013.01); *G05B 19/0428* (2013.01); *G08C 17/02* (2013.01); *H04W 4/38* (2018.02); *G05B 2219/25428* (2013.01)

(58) Field of Classification Search
CPC ....... H04L 69/08; H04L 43/045; H04L 43/08; H04L 43/18; G05B 19/0428; G05B 2219/25428; G05B 19/042; H04W 4/38; H04B 17/0085; H04M 11/06
USPC ........................................................ 370/466
See application file for complete search history.

(56) References Cited

U.S. PATENT DOCUMENTS

| | | | |
|---|---|---|---|
| 5,970,430 A | 10/1999 | Burns et al. | |
| 8,390,150 B2* | 3/2013 | Vande Vusse | ..... G05B 19/0423 307/130 |
| 2008/0236679 A1* | 10/2008 | Esposito | ................... F16K 7/14 137/487.5 |
| 2013/0188752 A1* | 7/2013 | Sin | ...................... H04L 27/0002 375/299 |
| 2014/0181951 A1* | 6/2014 | Birkhofer | ........... H04L 63/0218 726/12 |
| 2015/0087290 A1 | 3/2015 | Murate | |

(Continued)

FOREIGN PATENT DOCUMENTS

JP    2015-064766 A    4/2015

OTHER PUBLICATIONS

China National Intellectual Property Administration, "First Office Action," issued in Chinese Patent Application No. 202011238082.5, which is a counterpart to U.S. Appl. No. 17/094,073, dated Apr. 13, 2022, 14 pages (6 pages of English translation of Office Action and 8 pages of original Chinese Office Action).

*Primary Examiner* — Kwang B Yao
*Assistant Examiner* — Syed M Bokhari

(57) ABSTRACT

A HART modem includes: a HART/Host communication conversion unit, which relays communication between a HART device and a HART host device; a communication waveform detection unit configured to generate data sampled from HART communication signals transmitted and received to and from the HART device; and a communication interface unit configured to transmit the data generated by the communication waveform detection unit to the HART host device.

15 Claims, 12 Drawing Sheets

(56) References Cited

U.S. PATENT DOCUMENTS

2018/0107184 A1\* 4/2018 Bihler ................. H04L 25/0298
2018/0191539 A1\* 7/2018 Haran ....................... H04L 1/00
2019/0246353 A1\* 8/2019 Jensen .................... H04L 67/12
2021/0064712 A1\* 3/2021 Xu .......................... G06F 30/20

\* cited by examiner

HART MODEM AND DIAGNOSTIC SYSTEM

CROSS-REFERENCE TO RELATED APPLICATION

The present application claims the benefit of and priority to Japanese Patent Application No. 2019-205321, filed on Nov. 13, 2019, the entire contents of which are incorporated by reference herein.

TECHNICAL FIELD

The present invention relates to a HART modem and a diagnostic system capable of investigating the status of HART communication.

BACKGROUND

Highway Addressable Remote Transducer (HART) communication is a communication method of superimposing a digital signal on a direct current signal (analog signal) of 4 to 20 mA used in control systems. The HART communication is used for the setting of a device by replacing field equipment (devices) of an existing control system with HART-enabled devices and then connecting a HART-enabled configurator (setting unit) to an analog signal line. The HART communication is also used for monitoring or controlling by transmitting and receiving measurement data of the devices, and for determining the health of measurements or timing of replacement of devices in an equipment management system connected in parallel to the control system by transmitting and receiving self-diagnostic results of the devices (see Patent Literature 1).

The product lifetime of the control system is as long as at least 30 years, and the HART communication is advantageous for users in that data communication is enabled by only replacing the devices with HART-enabled devices while using the existing control system as-is and adding (connecting in parallel) a configurator or an equipment management system (referred to collectively as HART host) to the control system.

However, depending on the wiring of the analog signal line, a load resistance required for the HART communication may be insufficient, or the analog signal line may be installed under a noise environment, which may interfere with the HART communication. Thus, the user desirable HART communication may be failed or become unstable.

When an error is encountered in writing or reading in the HART communication after the installation of the HART device and the HART host, a voltage is measured with a multimeter (tester), and the noise level, a digital communication waveform of a command issued from the HART host, and the digital communication waveform of response that the HART device issues for the command are inspected with an oscilloscope in order to inspect the cause. Also, various machines are used as needed to determine the cause of the communication error, such as confirming the contents of communication data with a protocol analyzer.

In field service operations that handle the HART devices, we sometimes wanted to investigate communications status due to the instability of HART communications. However, there was a problem of not having the necessary equipment at hand when we encountered a situation where we wanted to investigate a problem in the field because the investigation equipment was not something we usually carried around.

CITATION LIST

Patent Literature

PTL 1: JP-A-2015-64766

SUMMARY

To solve the above-described problem, it is an object of the present invention to provide a HART modem and a diagnostic system that allow for easy investigation of the HART communication status.

A HART modem of the present invention comprises: a communication conversion unit configured to relay communication between field equipment and a host device or a diagnostic device on a higher level; a waveform detection unit configured to generate data sampled from HART communication signals to be transmitted and received to and from the field equipment; and a communication interface unit configured to transmit data generated by the waveform detection unit to the diagnostic device.

A HART modem of the present invention comprises: a communication conversion unit configured to relay communication between field equipment and a host device or a diagnostic device on a higher level; a waveform detection unit configured to generate data sampled from HART communication signals to be transmitted and received to and from the field equipment; and a record management unit configured to record data generated by the waveform detection unit to a storage medium mounted on the HART modem.

A HART modem of the present invention comprises: a communication conversion unit configured to relay communication between field equipment and a host device or a diagnostic device on a higher level; and a record management unit configured to record a HART communication command transmitted to the field equipment and a response received from the field equipment on a storage medium attached to the HART modem.

A HART modem of the present invention comprises: a communication conversion unit configured to relay communication between field equipment and a host device or a diagnostic device on a higher level; a waveform detection unit configured to measure a wave height value of a HART communication signal to be transmitted and received to and from the field equipment; and a communication interface unit configured to transmit a measurement result of the waveform detection unit to the diagnostic device.

A HART modem of the present invention comprises: a communication conversion unit configured to relay communication between field equipment and a host device or a diagnostic device on a higher level; a data management unit configured to measure the number of times of no response, which is the number of times a response from the field equipment cannot be received within a specified period from a transmission of a HART communication command to the field equipment, or a no-response ratio, which is a ratio of a total number of times the response cannot be received within the specified period from the transmission of each command to a total number of commands transmitted to the field equipment; and a communication interface unit configured to transmit a measurement result of the data management unit to the diagnostic device.

A HART modem of the present invention comprises: a communication conversion unit configured to relay communication between field equipment and a host device or a diagnostic device on a higher level; a power supply status confirmation unit configured to measure a DC voltage of an analog signal line connecting the field equipment to the HART modem; and a communication interface unit configured to transmit a measurement result of the power supply status confirmation unit to the diagnostic device.

One configuration example of the HART modem of the present invention further comprises a display unit configured to display the measurement result.

Also, one configuration example of the HART modem of the present invention further comprises a determination unit configured to refer to a knowledge database that stores HART protocol specifications and a past HART communication diagnosis finding and determine whether the measurement result complies with the HART protocol specifications and whether the measurement result is consistent with the past HART communication diagnosis finding, and is characterized in that the communication interface unit transmits a determination result of the determination unit to the diagnostic device.

Also, one configuration example of the HART modem of the present invention further comprises an instruction unit configured to acquire information on a coping process for a situation when the measurement result does not comply with the HART protocol specifications or when the measurement result is not consistent with the past HART communication diagnosis findings from the knowledge database and is characterized in that the communication interface unit transmits the information on the coping process acquired by the instruction unit to the diagnostic device.

A diagnostic system according to the present invention comprises: a HART modem; and a diagnostic device, and is characterized in that the diagnostic device comprises: a waveform generation unit configured to generate an image for displaying a signal waveform indicated by received data transmitted from the HART modem upon reception of the data; and a display unit configured to display the image generated by the waveform generation unit.

A diagnostic system according to the present invention comprises: a diagnostic device; and a HART modem configured to relay communication between field equipment and a host device or the diagnostic device on a higher level; and is characterized in that the HART modem comprises: a communication conversion unit configured to relay communication between the field equipment and the host device or the diagnostic device; and a first communication interface unit configured to transmit a HART communication command transmitted to the field equipment and a response received from the field equipment to the diagnostic device, and the diagnostic device comprises: a second communication interface unit configured to receive the command and the response transmitted from the HART modem; a communication protocol analysis unit configured to convert the received command and response into a character string indicating the contents thereof; and a display unit configured to display the character string obtained by the communication protocol analysis unit.

A diagnostic system according to the present invention comprises: a diagnostic device; and a HART modem configured to relay communication between field equipment and a host device or the diagnostic device on a higher level; and is characterized in that the HART modem comprises: a communication conversion unit configured to relay communication between the field equipment and the host device or the diagnostic device; first communication interface unit configured to transmit a HART communication command transmitted to the field equipment and a response received from the field equipment to the diagnostic device and receive a character string transmitted from the diagnostic device; and a record management unit configured to record the received character string on a storage medium attached to the HART modem, and is characterized in that the diagnostic device comprises: a communication protocol analysis unit configured to convert the command and the response transmitted from the HART modem into the character string indicating the contents thereof, and a second communication interface unit configured to receive the commands and the responses transmitted from the HART modem and to transmit the character string obtained by the communication protocol analysis unit to the HART modem.

According to the present invention, the signal waveform can be displayed on the diagnostic device by generating and transmitting signal waveform data of the HART communication to the diagnostic device.

According to the present invention, an easy investigation of the HART communication status is enabled with simple equipment, such as the HART modem and the diagnostic device (for example, a PC or a smartphone).

According to the present invention, data of the HART communication signals is generated and recorded in a storage medium, so that the data recorded on the storage medium can be confirmed via an external device.

According to the present invention, commands and responses of the HART communication are recorded on the storage medium, so that the commands and the responses recorded on the storage medium can be confirmed via the external device.

According to the present invention, by measuring a wave height value of the HART communication signal and transmitting a measurement result to the diagnostic device, the wave height value can be confirmed by the diagnostic device and whether load resistance of an analog signal line required to perform the HART communication is appropriate can be confirmed.

According to the present invention, by measuring the number of times of no response or no-response ratio and transmitting the measurement results to the diagnostic device, the number of times of no-response or the no-response ratio can be confirmed by the diagnostic device and the communication state of the HART communication can be diagnosed.

According to the present invention, by measuring a DC voltage of the analog signal line and transmitting the measurement results to the diagnostic device, the DC voltage of the analog signal line can be confirmed by the diagnostic device, and the status of the power supply of the analog signal line can be confirmed.

According to the present invention, with the provision of the display unit on the HART modem, the measurement results can be confirmed by the HART modem alone.

According to the present invention, whether the measurement results comply with the HART protocol specifications and whether the measurement results are consistent with the past HART communication diagnosis findings can be determined, and the determination results can be confirmed via the diagnostic device.

Also, according to the present invention, a coping process for the case when the measurement results do not comply with the HART protocol specifications or when the measurement results are not consistent with the past HART communication diagnosis findings can be acquired from the knowledge database and transmitted the same to the diagnostic device, and the coping process can be confirmed via the diagnostic device.

Also, according to the present invention, command and response of the HART communication are transmitted to the diagnostic device, and the command and the response are converted to a character string in the diagnostic device so that the character string indicating the contents of the command and the response can be displayed on the diagnostic device.

According to the present invention, command and response of the HART communication are transmitted to the diagnostic device, the command and the response are converted into a character string in the diagnostic device and transmitted to the HART modem, and the character string received by the HART modem is recorded in a storage medium so that the character string recorded in the storage medium can be confirmed via the external device.

DESCRIPTION OF EMBODIMENTS

Figure 1:
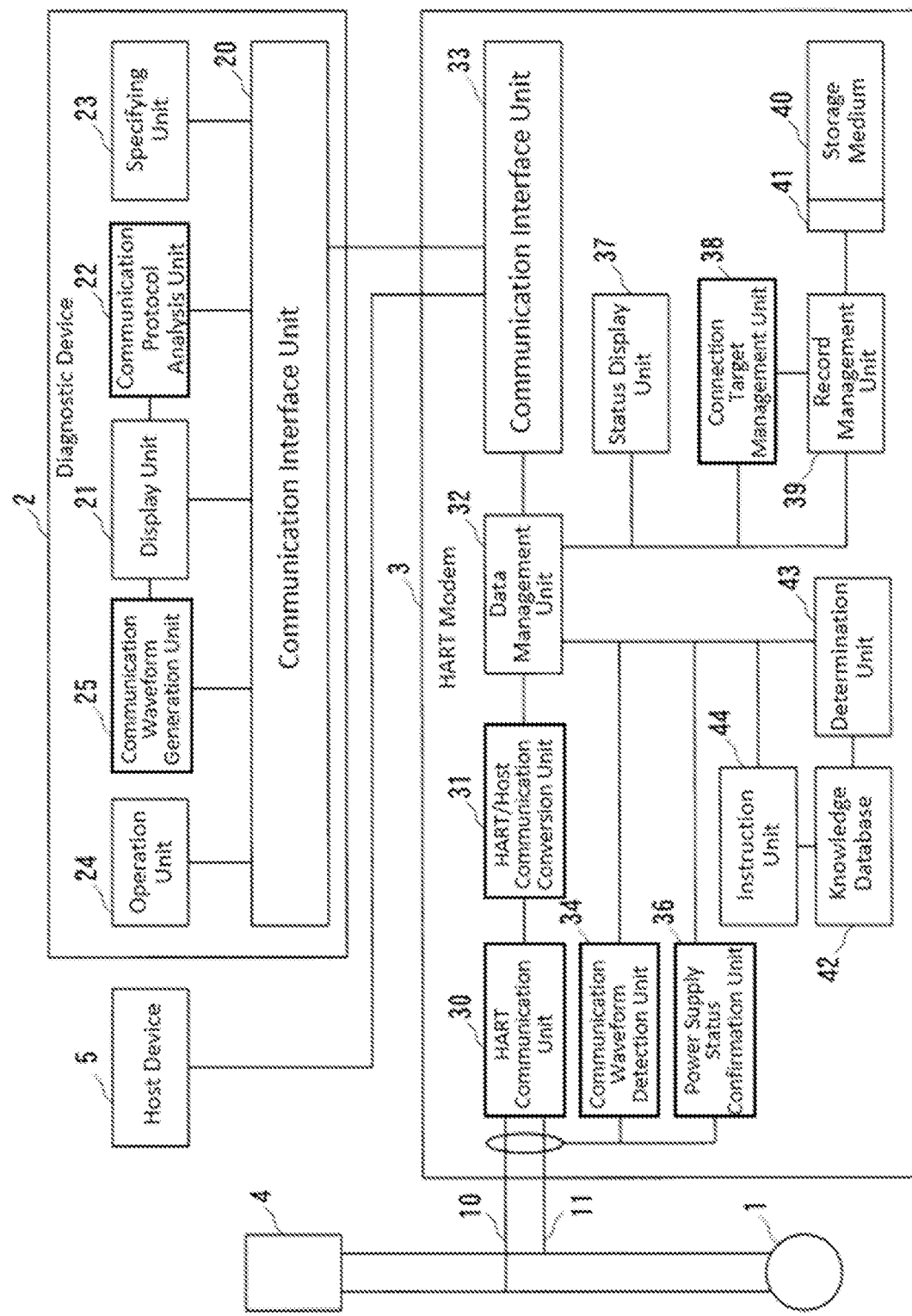
FIG. 1 is a block diagram illustrating a configuration of a diagnostic system according to an exemplary embodiment of the present invention.

Referring now to the drawings, exemplary embodiments of the present invention will be described. FIG. 1 is a block diagram illustrating a configuration of a diagnostic system according to an exemplary embodiment of the present invention. The diagnostic system comprises, for example, a HART device 1, which is field equipment such as a pressure transmitter and a positioner, a diagnostic device 2, and a HART modem 3, which is a communication device configured to relay communication between the HART device 1 and the diagnostic device 2 or a host device 5.

The diagnostic device 2 comprises: a communication interface unit 20 configured to control communication with the HART modem 3; a display unit 21 configured to display images and measurement results from the HART modem 3; a communication protocol analysis unit 22 configured to convert command and response transmitted from the HART modem 3 into a character string indicating the contents thereof; a specifying unit 23 configured to specify communication to be permitted for the HART modem 3 or a device to be connected; an operation unit 24 configured to allow a user to issue an instruction to the diagnostic device 2; and a communication waveform generation unit 25 configured to generate an image for displaying a signal waveform indicated by received data upon reception of the data transmitted from the HART modem 3.

The HART modem 3 comprises: a HART communication unit 30 configured to control communication with the HART device 1; a HART/Host communication conversion unit 31 configured to execute a conversion process between a frequency signal (HART signal) and a digital signal; a data management unit 32, which manages the data in the HART modem 3 and measures the communication status; a communication interface unit 33 configured to control communication with the diagnostic device 2 or the host device 5; a communication waveform detection unit 34 configured to generate data sampled from frequency signals transmitted and received to and from the HART device 1; a power supply status confirmation unit 36 configured to measure a DC voltage of analog signal lines 10 and 11 connecting the HART device 1 and the HART modem 3; a status display unit 37 configured to display measurement results from the HART modem 3; a connection target management unit 38 configured to determine whether or not to allow the HART modem 3 to process upon reception of the specification of the device to be connected from the diagnostic device 2; a record management unit 39 configured to record data generated by the communication waveform detection unit 34, commands and responses, and character strings indicating the contents of the commands and the responses in a storage medium 40 mounted in a slot 41; a knowledge database 42 configured to store HART protocol specifications and past HART communication diagnosis findings; a determination unit 43 configured to refer to the knowledge database 42 and determine whether measurement results comply with the HART protocol specifications and whether the measurement results are consistent with the past HART communication diagnosis findings; and an instruction unit 44 configured to acquire a coping process for a situation when a measurement result does not comply with the HART protocol specifications or when the measurement result is not consistent with the past HART communication diagnosis findings from the knowledge database 42.

Reference numeral 4 in FIG. 1 designates a power source or an I/O module configured to supply a power supply voltage to the HART device 1 via the analog signal lines 10 and 11.

Figure 2:
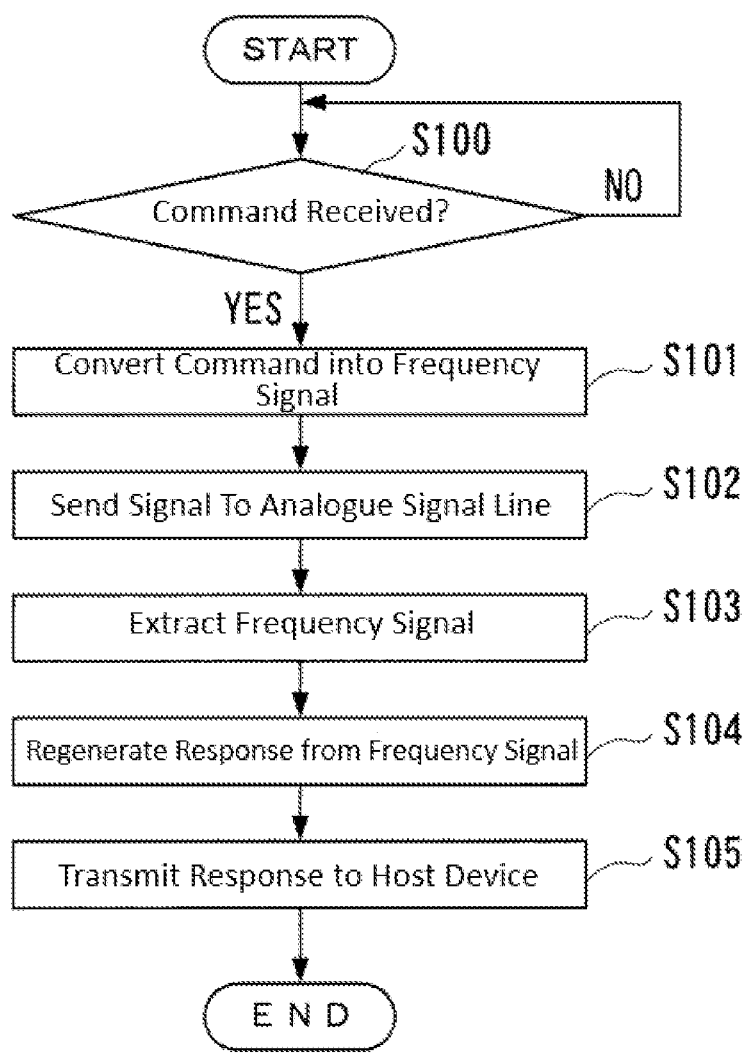
FIG. 2 is an explanatory flowchart describing a communication function of a HART modem according to the exemplary embodiment of the present invention.

FIG. 2 is an explanatory flowchart describing a communication function of the HART modem 3. The communication interface unit 33 of the HART modem 3 receives via the communication interface unit 20 digital signals (commands) transmitted from the host device 5 that constitutes an equipment management system (step S100 in FIG. 2).

The HART/Host communication conversion unit 31 of the HART modem 3 converts the command received from the communication interface unit 33 via the data management unit 32 into a frequency signal (step S101 in FIG. 2).

The HART communication unit 30 of the HART modem 3 superimposes the frequency signal obtained by the HART/Host communication conversion unit 31 on a 4 to 20 mA current signal and transmits it to the analog signal lines 10 and 11 (step S102 in FIG. 2).

In this manner, a command can be transmitted to the HART device 1.

Next, the HART communication unit 30 extracts the frequency signal superimposed on the 4 to 20 mA current signal transmitted from the HART device 1 (step S103 in FIG. 2).

The HART/Host communication conversion unit 31 regenerates a digital signal (response) from the frequency signal extracted by the HART communication unit 30 (FIG. 2 step S104).

The communication interface unit 33 transmits the response passed from the HART/Host communication conversion unit 31 via the data management unit 32 to the host device 5 (step S105 in FIG. 2).

In this manner, the response returned by the HART device 1 to the command may be transmitted to the host device 5.

Note that, in FIG. 2, the operation of the HART modem 3 relaying communication between the host device 5 and the HART device 1 is described, but in the present exemplary embodiment, the data management unit 32 can also generate commands for diagnosis, as described below. When transmitting commands for diagnosis to the HART device 1, the processes in steps S101 to S104 are performed.

The communication interface unit 33 may communicate with the diagnostic device 2 or the host device 5 in wired or wireless communication.

The specifying unit 23 of the diagnostic device 2 may be configured to transmit a communication specifying signal that specifies communication to be permitted for the HART modem 3 upon reception of a communication specification to be permitted for the HART modem 3 from the user. For example, the communication specifying signal includes information such that only certain commands are permitted to transmit, only command transmission is not permitted, and command transmission and reception are not permitted.

Upon reception of a communication specifying signal via the communication interface unit 33, the data management unit 32 of the HART modem 3 permits the execution of the process in FIG. 2 only for the type of communication permitted by the communication specifying signal.

Figure 3:
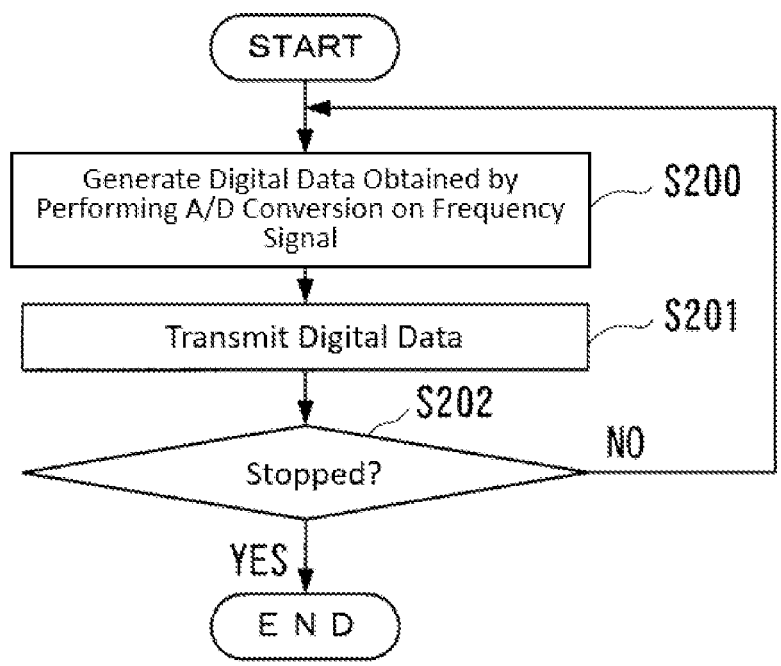
FIG. 3 is an explanatory flowchart describing a signal waveform display function of the HART modem according to the exemplary embodiment of the present invention.
Figure 4:
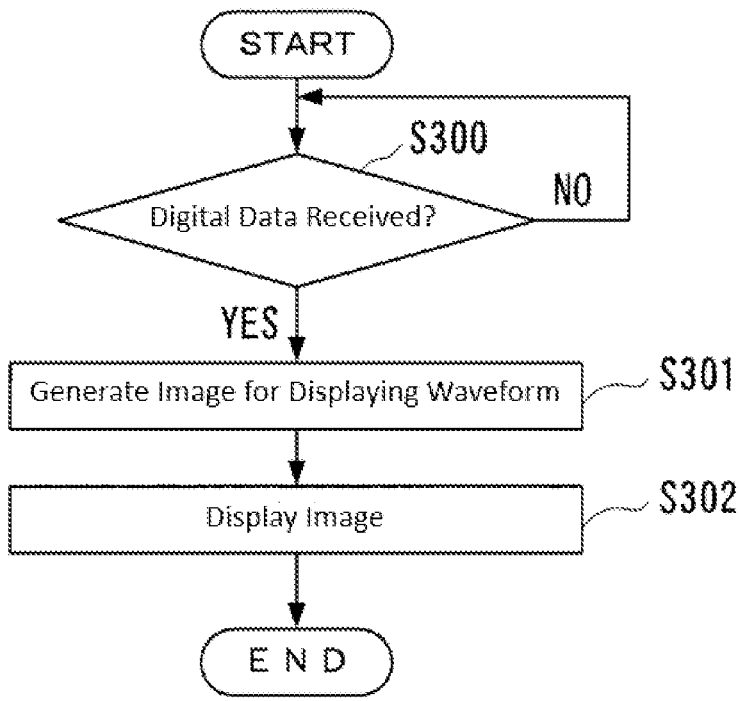
FIG. 4 is an explanatory flowchart describing a signal waveform display function of a diagnostic device according to the exemplary embodiment of the present invention.

Next, the operation of the present exemplary embodiment other than the communication function will be described. FIG. 3 is an explanatory flowchart describing a signal waveform display function of the HART modem 3, and FIG. 4 is an explanatory flowchart describing a signal waveform display function of the diagnostic device 2.

The communication waveform detection unit 34 of the HART modem 3 extracts a frequency signal superimposed on a 4 to 20 mA current signal on the analog signal lines 10 and 11 and generates digital data obtained by performing A/D conversion on the frequency signal at a fixed sampling frequency (step S200 in FIG. 3).

The data management unit 32 passes the digital data generated by the communication waveform detection unit 34 to the communication interface unit 33. The communication interface unit 33 transmits the received digital data from the data management unit 32 to the diagnostic device 2 (step S201 in FIG. 3).

Note that, needless to say, the digital data generated by the communication waveform detection unit 34 may be stored once in the storage medium 40 or another storage medium before transmission.

Upon reception of the digital data from the HART modem 3 via the communication interface unit 20 (YES in step S300 in FIG. 4), the communication waveform generation unit 25 of the diagnostic device 2 generates an image for displaying a signal waveform indicated by the received digital data (step S301 in FIG. 4).

The display unit 21 of the diagnostic device 2 displays the image generated by the communication waveform generation unit 25 (step S302 in FIG. 4).

In this manner, the HART communication signal waveform can be displayed on the diagnostic device 2, so that easy investigation of the HART communication status is enabled with simple equipment such as the HART modem 3 and the diagnostic device 2.

The processes of FIG. 3 and FIG. 4 are started in response to a WAVEFORM DISPLAY START instruction signal output from the operation unit 24 operated by a user of the diagnostic device 2, for example. The WAVEFORM DISPLAY START instruction signal is transmitted via the communication interface unit 20 to the HART modem 3.

Also, the processes of FIG. 3 and FIG. 4 are stopped in response to a WAVEFORM DISPLAY STOP instruction signal output from the operation unit 24 operated by a user of the diagnostic device 2, for example. The WAVEFORM DISPLAY STOP instruction signal is transmitted via the communication interface unit 20 to the HART modem 3. Needless to say, the signal waveforms displayed by the diagnostic device 2 will be updated over time, as the processes in steps S200 and S201 are repeatedly executed until the processes are stopped in response to the WAVEFORM DISPLAY STOP instruction signal (YES in step S202 in FIG. 3).

In the above example, the HART communication signal waveform is displayed, but needless to say, if the processes of FIG. 3 and FIG. 4 are started when no HART communication is taking place, a waveform of the noise superimposed on the 4 to 20 mA current signal on the analog signal lines 10 and 11 can be displayed.

The specifying unit 23 of the diagnostic device 2 may be configured to transmit a device specifying signal which specifies a device to be connected to the HART modem 3 upon reception of a specification of the device to be connected from the user. The specifying unit 23 stores in advance identification information of various devices to be connected to the HART modem 3. The device specifying signal transmitted by the specifying unit 23 includes the identification information of the device specified by the user.

Upon reception of the device specifying signal via the communication interface unit 33, the connection target management unit 38 of the HART modem 3 permits execution of the processes in FIG. 3 and FIG. 4 only for the HART device 1 specified by the device specifying signal and does not permit the execution for the HART device 1 not specified by the device specifying signal. Note that the identification information of the HART device 1 can be obtained through the HART communication with the HART device 1. This information allows the user to determine whether the HART device 1 connected to the HART modem 3 is the device specified by the device specifying signal.

Figure 5:
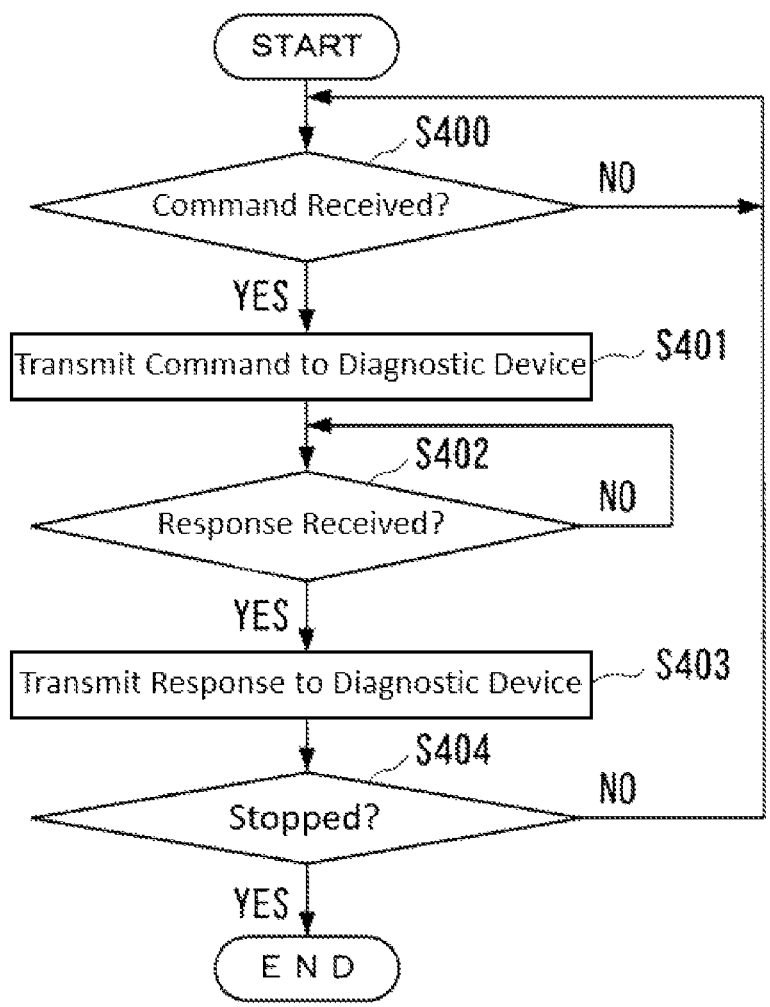
FIG. 5 is an explanatory flowchart describing a communication protocol analysis function of the HART modem according to the exemplary embodiment of the present invention.
Figure 6:
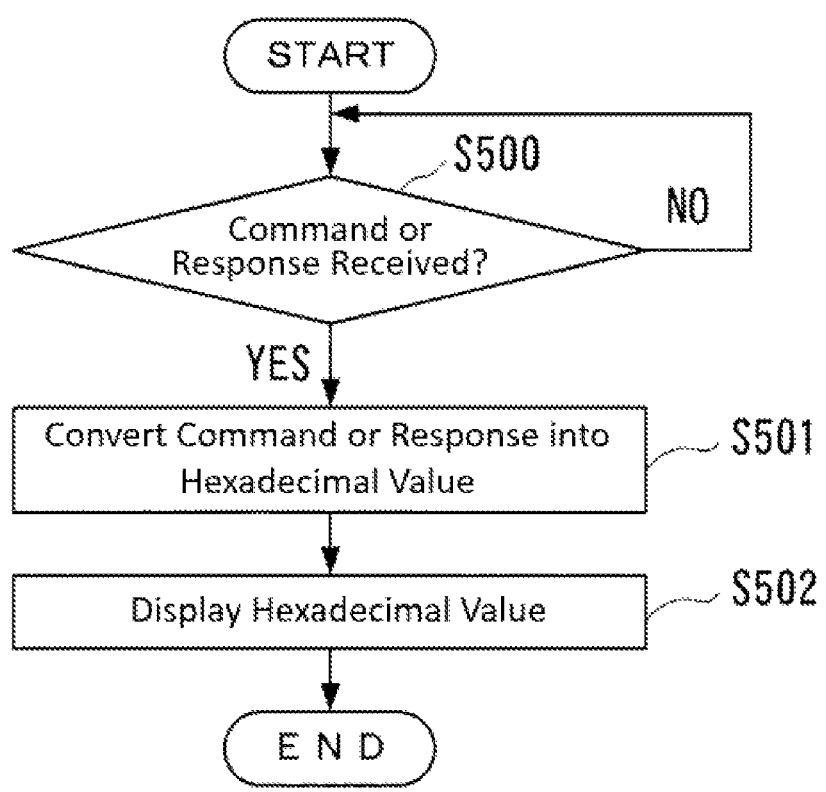
FIG. 6 is an explanatory flowchart describing a communication protocol analysis function of the diagnostic device according to the exemplary embodiment of the present invention.

FIG. 5 is an explanatory flowchart describing a communication protocol analysis function of the HART modem 3, and FIG. 6 is an explanatory flowchart describing a communication protocol analysis function of the diagnostic device 2.

Upon reception of a command from the host device 5 (YES in step S400 in FIG. 5), as described in step S100, the data management unit 32 of the HART modem 3 transmits the received command to the diagnostic device 2 via the communication interface unit 33 (step S401 in FIG. 5).

Upon reception of the command from the HART modem 3 via the communication interface unit 20 (YES in step S500 in FIG. 6), the communication protocol analysis unit 22 of the diagnostic device 2 converts the received command into a hexadecimal value, which is a human-understandable character string (step S501 in FIG. 6).

The display unit 21 of the diagnostic device 2 displays the hexadecimal value obtained by the communication protocol analysis unit 22 (step S502 in FIG. 6). Note that although the command is transmitted from the host device 5, the communication protocol analysis in the present exemplary embodiment is performed independently of the operation of the host device 5, so that the command received by the HART modem 3 is configured to be transmitted to the communication protocol analysis unit 22 of the diagnostic device 2.

As described in step S104, upon regeneration of a response by the HART/Host communication conversion unit 31 (Yes in step S402 in FIG. 5), the data management unit 32 of the HART modem 3 transmits the response to the diagnostic device 2 via the communication interface unit 33 (step S403 in FIG. 5).

Upon reception of the response from the HART modem 3 via the communication interface unit 20 (YES in step S500), the communication protocol analysis unit 22 of the diagnostic device 2 converts the received response into a hexadecimal value (step S501 in FIG. 6).

The display unit 21 of the diagnostic device 2 displays the hexadecimal value obtained by the communication protocol analysis unit 22 (step S502).

The result of converting the HART communication command and the response into a human-understandable character string in this manner can be displayed on diagnostic device 2.

The processes of FIG. 5 and FIG. 6 are started in response to an ANALYSIS START instruction signal output from the operation unit 24 operated by a user of the diagnostic device 2, for example. The ANALYSIS START instruction signal is transmitted via the communication interface unit 20 to the HART modem 3.

Also, the processes of FIG. 5 and FIG. 6 are stopped in response to an ANALYSIS STOP instruction signal output from the operation unit 24 operated by a user of the diagnostic device 2, for example. The ANALYSIS STOP instruction signal is transmitted via the communication interface unit 20 to the HART modem 3.

In the present exemplary embodiment, the HART communication commands and responses are converted into hexadecimal values, but the communication protocol analysis unit 22 may convert the commands and responses into decoded character strings indicating their meaning. This allows the command and response to be converted and displayed in a format that humans can easily understand.

Similarly, as described above, the specifying unit 23 of the diagnostic device 2 may be configured to transmit a device specifying signal to the HART modem 3 upon reception of a specification of the device to be connected from the user.

Upon reception of the device specifying signal via the communication interface unit 33, the connection target management unit 38 of the HART modem 3 permits execution of the processes in FIG. 5 and FIG. 6 only for the HART device 1 specified by the device specifying signal and does not permit the execution for the HART device 1 not specified by the device specifying signal.

Figure 7:
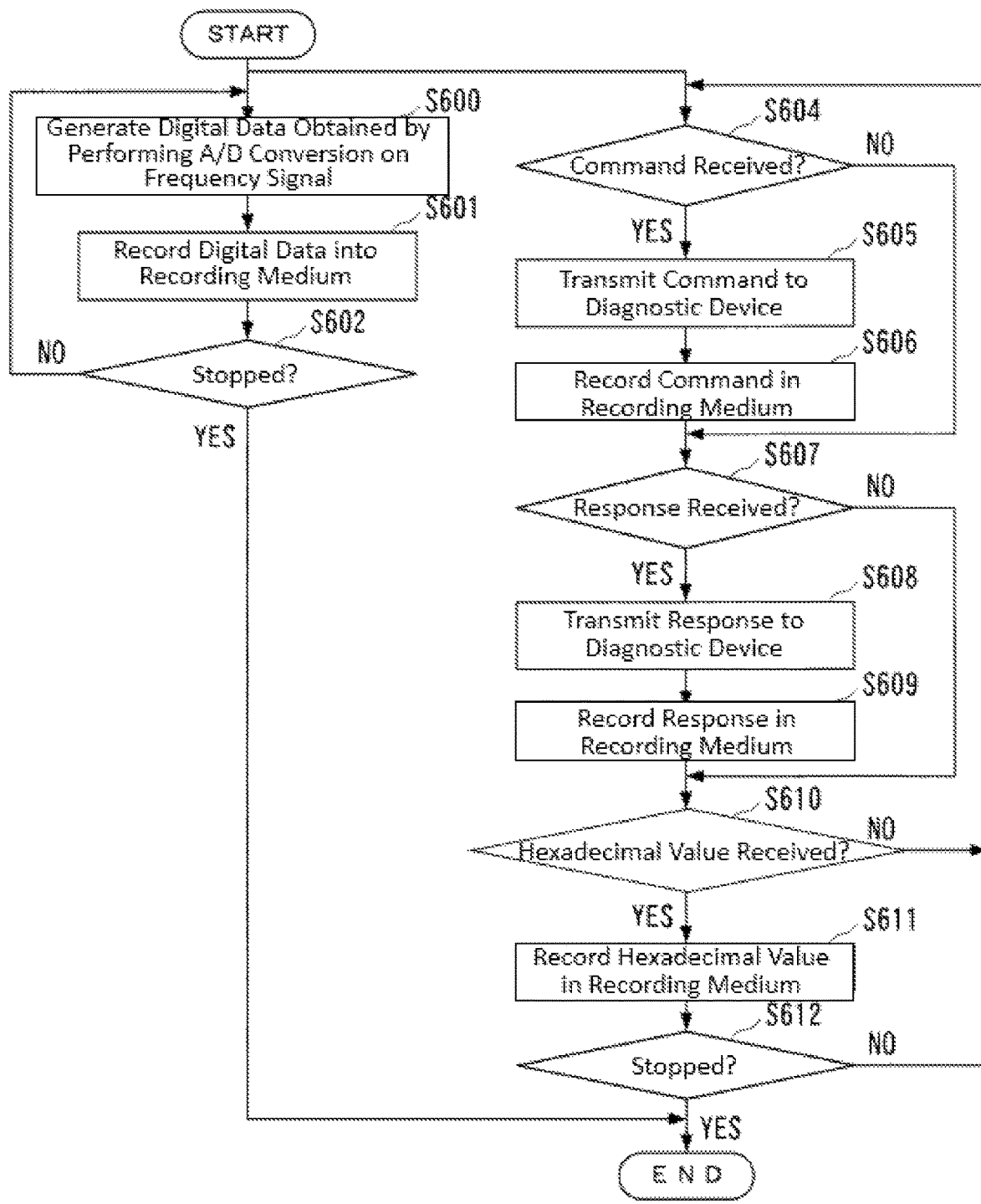
FIG. 7 is an explanatory flowchart describing a communication recording function of the HART modem according to the exemplary embodiment of the present invention.
Figure 8:
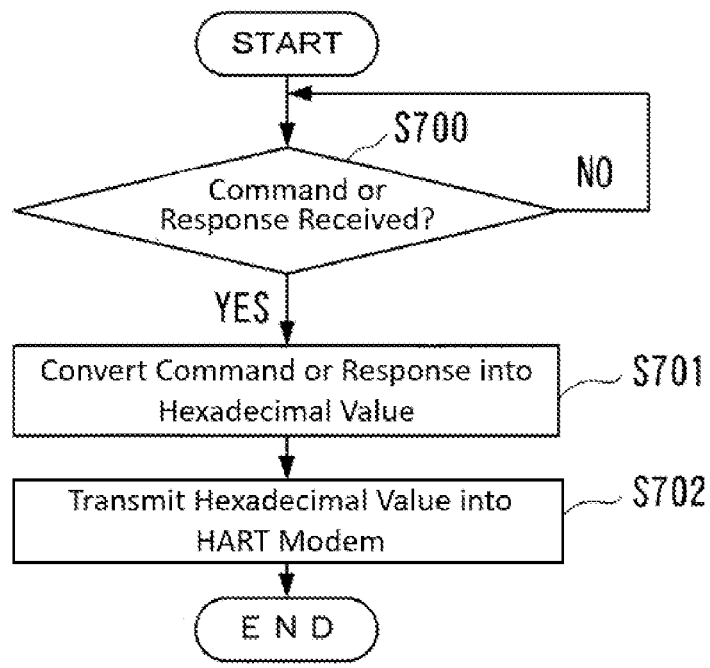
FIG. 8 is an explanatory flowchart describing a communication recording function of the diagnostic device according to the exemplary embodiment of the present invention.

FIG. 7 is an explanatory flowchart describing a communication recording function of the HART modem 3, and FIG. 8 is an explanatory flowchart describing a communication recording function of the diagnostic device 2.

The process of step S600 in FIG. 7 is the same as steps S200 and S201 in FIG. 3.

The data management unit 32 of the HART modem 3 passes the digital data generated by the communication waveform detection unit 34 to the record management unit 39. The record management unit 39 records the received digital data from the data management unit 32 to the storage medium 40 (step S601 in FIG. 7).

The HART modem 3 is provided with the slot 41 for mounting the storage medium 40. Examples of the storage medium 40 include, for example, an SD card. The storage medium can be something like an SSD (Solid State Drive) that is not designed to be attachable and detachable.

In addition, the processes of steps S604 and S605 in FIG. 7 are the same as steps S400 and S401 in FIG. 5.

The data management unit 32 of the HART modem 3 passes the received command to the record management unit 39. The record management unit 39 records the command received from the data management unit 32 in the storage medium 40 (step S606 in FIG. 7).

The processes in steps S607 and S608 in FIG. 7 are the same as steps S402 and S403 in FIG. 5.

The data management unit 32 of the HART modem 3 passes the response regenerated by the HART/Host communication conversion unit 31 to the record management unit 39. The record management unit 39 records the response received from the data management unit 32 to the storage medium 40 (step S609 in FIG. 7).

In addition, upon transmission of the command or the response from the HART modem 3 to the diagnostic device 2, the communication protocol analysis unit 22 of the diagnostic device 2 converts the command or the response received from the HART modem 3 via the communication interface unit 20 into a hexadecimal value (step S700 and S701 in FIG. 8).

The communication interface unit 20 of the diagnostic device 2 transmits the hexadecimal value obtained by the communication protocol analysis unit 22 to the HART modem 3 (step S702 in FIG. 8).

Upon reception of the hexadecimal value from the diagnostic device 2 via the communication interface unit 33 (YES in step S610 in FIG. 7), the data management unit 32 of the HART modem 3 passes the received hexadecimal value to the record management unit 39. The record management unit 39 records the hexadecimal value received from the data management unit 32 to the storage medium 40 (step S611 in FIG. 7).

In this manner, the HART communication signal waveform data, the command and the response, and the hexadecimal value of the command and the response may be recorded in the storage medium 40. The storage medium 40 may be disconnected from the HART modem 3 and mounted on another device, and thus information recorded in the storage medium 40 may be confirmed via another device.

The processes of FIG. 7 and FIG. 8 are started in response to a RECORDING START instruction signal output from the operation unit 24 operated by a user of the diagnostic device 2, for example. The RECORDING START instruction signal is transmitted via the communication interface unit 20 to the HART modem 3.

Also, the processes of FIG. 7 and FIG. 8 are stopped in response to a RECORDING STOP instruction signal output from the operation unit 24 operated by a user of the diagnostic device 2, for example. The RECORDING STOP instruction signal is transmitted via the communication interface unit 20 to the HART modem 3.

Note that, similar to the communication protocol analysis function, the communication protocol analysis unit 22 of the diagnostic device 2 may convert the command and the response to the hexadecimal value and convert the command and the response into decoded character strings indicating their meaning. This allows the character string indicating the contents of the command and the response to be transmitted from the diagnostic device 2 to the HART modem 3 and recorded in the storage medium 40.

In the present exemplary embodiment, at least one type of information of (I) data of the signal waveform, (II) commands and responses, (III) hexadecimal values of the commands and the responses, and (IV) character strings indicating the content of the command and the response may be recorded in the storage medium 40.

Similarly, as described above, the specifying unit 23 of the diagnostic device 2 may be configured to transmit a device specifying signal to the HART modem 3 upon reception of a specification of the device to be connected from the user.

Upon reception of the device specifying signal via the communication interface unit 33, the connection target management unit 38 of the HART modem 3 permits execution of the processes in FIG. 7 and FIG. 8 only for the HART device 1 specified by the device specifying signal and does not permit the execution for the HART device 1 not specified by the device specifying signal.

In the present exemplary embodiment, the description is given by an example in which the signal waveform display function described in FIG. 3 and FIG. 4 and the communication recording function described in FIG. 7 and FIG. 8 are performed individually. However, the signal waveform data may be recorded in the storage medium 40 simultaneously as the signal waveform display.

In the present exemplary embodiment, the description is given by an example in which the communication protocol analysis function described in FIG. 5 and FIG. 6 and the communication recording function described in FIG. 7 and FIG. 8 are performed individually. However, at least one type of information from (II) to (IV) may be recorded in the storage medium 40 simultaneously as the communication protocol analysis results are displayed.

The record management unit 39 of the HART modem 3 may record the identification information of the HART device 1 along with at least one of (I) to (IV) in the storage medium 40.

The identification information of the HART device 1 can be obtained through the HART communication with the HART device 1.

Figure 9:
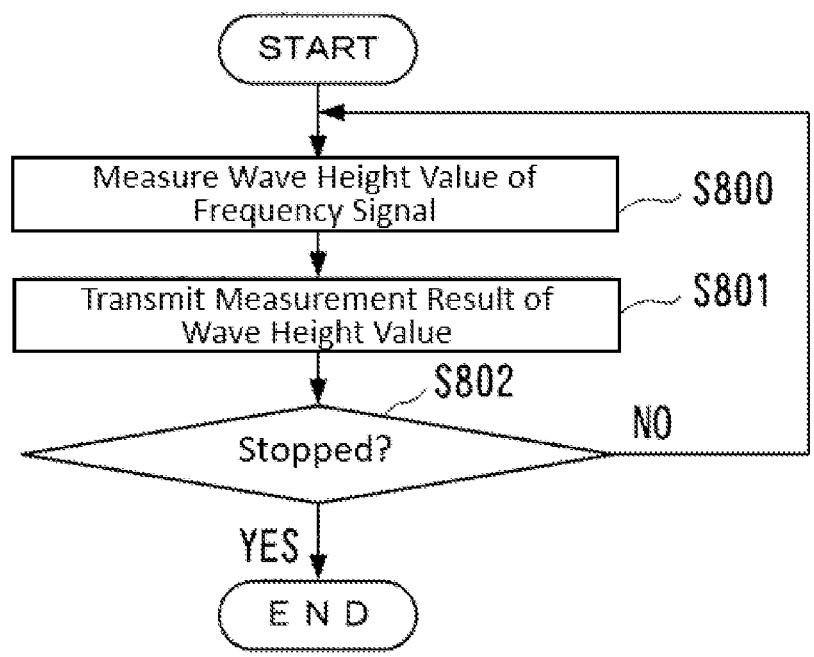
FIG. 9 is an explanatory flowchart describing a wave height measurement function of the HART modem according to the exemplary embodiment of the present invention.
Figure 10:
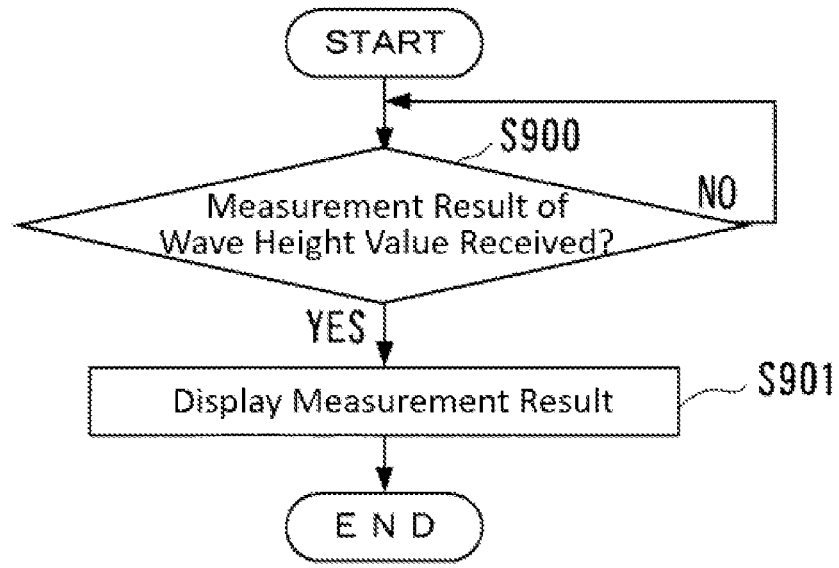
FIG. 10 is an explanatory flowchart describing a wave height measurement function of the diagnostic device according to the exemplary embodiment of the present invention.

FIG. 9 is an explanatory flowchart describing a wave height measuring function of the HART modem 3, and FIG. 10 is an explanatory flowchart describing a wave height measurement function of the diagnostic device 2.

The communication waveform detection unit 34 of the HART modem 3 extracts the frequency signal superimposed on the 4 to 20 mA current signal on the analog signal lines 10 and 11 and measures a wave height value of the frequency signal (step S800 in FIG. 9).

The data management unit 32 passes the measurement result of the wave height value by the communication waveform detection unit 34 to the communication interface unit 33. The communication interface unit 33 transmits the received measurement results from the data management unit 32 to the diagnostic device 2 (step S801 in FIG. 9).

Upon reception of the measurement result of the wave height value from the HART modem 3 via the communication interface unit 20 (YES in step S900 in FIG. 10), the display unit 21 of the diagnostic device 2 displays the received measurement result (step S901 in FIG. 10).

In this manner, the wave height value of the HART communication signal waveform can be confirmed by the diagnostic device 2, and whether the load resistance of the analog signal lines 10 and 11 is appropriate or not can be confirmed.

The processes of FIG. 9 and FIG. 10 are started in response to a MEASUREMENT START instruction signal output from the operation unit 24 operated by a user of the diagnostic device 2, for example. The MEASUREMENT START instruction signal is transmitted via the communication interface unit 20 to the HART modem 3.

Also, the processes of FIG. 9 and FIG. 10 are stopped in response to a MEASUREMENT STOP instruction signal output from the operation unit 24 operated by a user of the diagnostic device 2, for example. The MEASUREMENT STOP instruction signal is transmitted via the communication interface unit 20 to the HART modem 3.

In the present exemplary embodiment, the wave height value measurement results are transmitted to the diagnostic device 2. However, the present exemplary embodiment is not limited thereto, and the data management unit 32 of the HART modem 3 may be configured to display the measurement results on the status display unit 37.

Figure 11:
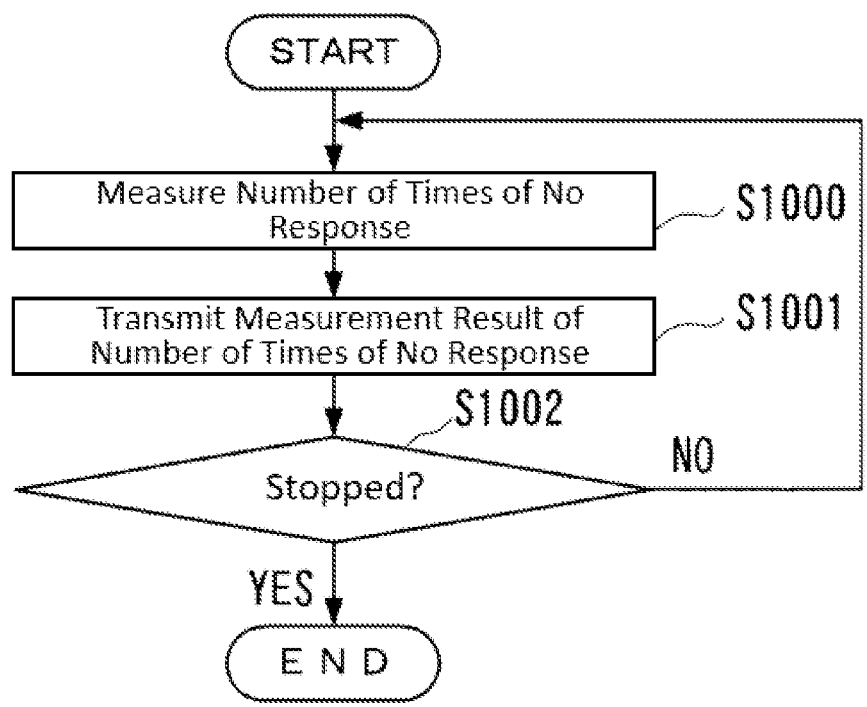
FIG. 11 is an explanatory flowchart describing a communication state diagnostic function of the HART modem according to the exemplary embodiment of the present invention.
Figure 12:
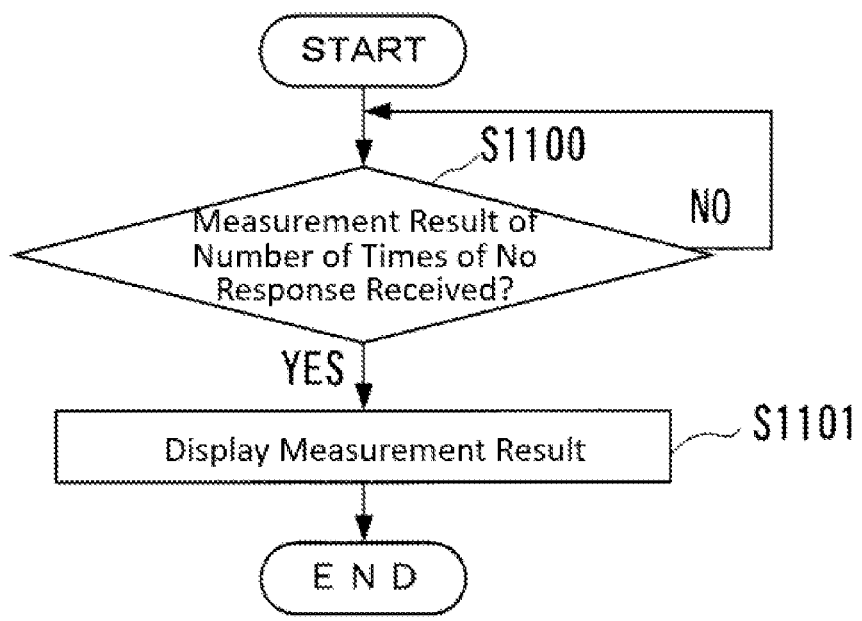
FIG. 12 is an explanatory flowchart describing a communication state diagnostic function of the diagnostic device according to the exemplary embodiment of the present invention.

FIG. 11 is an explanatory flowchart describing a communication state diagnostic function of the HART modem 3, and FIG. 12 is an explanatory flowchart describing a communication state diagnostic function of the diagnostic device 2.

The data management unit 32 of the HART modem 3 measures the number of times of no response, which is the number of times of the response from the HART device 1 could not be received within a specified period from the time the command was transmitted to the HART device 1 (step S1000 in FIG. 11).

The data management unit 32 passes the measurement result of the number of times of no response to the communication interface unit 33. The communication interface unit 33 transmits the received measurement results from the data management unit 32 to the diagnostic device 2 (step S1001 in FIG. 11).

Upon reception of the measurement result of the number of times of no response from the HART modem 3 via the communication interface unit 20 (YES in step S1100 in FIG. 12), the display unit 21 of the diagnostic device 2 displays the received measurement result (step S1101 in FIG. 12).

In this manner, the number of times of no response can be confirmed by diagnostic device 2, and the communication state of the HART communication can be diagnosed.

The processes of FIG. 11 and FIG. 12 are started in response to a COMMUNICATION STATE DIAGNOSIS START instruction signal output from the operation unit 24 operated by a user of the diagnostic device 2, for example. The COMMUNICATION STATE DIAGNOSIS START instruction signal is transmitted via the communication interface unit 20 to the HART modem 3.

Also, the processes of FIG. 11 and FIG. 12 are stopped in response to a COMMUNICATION STATE DIAGNOSIS STOP instruction signal output from the operation unit 24 operated by a user of the diagnostic device 2, for example. The COMMUNICATION STATE DIAGNOSIS STOP instruction signal is transmitted via the communication interface unit 20 to the HART modem 3. Needless to say, the number of times of no response will be updated over time, as the processes in steps S1000 and S1001 are repeatedly executed until the processes are stopped in response to the COMMUNICATION STATE DIAGNOSIS STOP instruction signal (YES in step S1002 in FIG. 11).

Note that, instead of the number of times of no response, the data management unit 32 may measure a ratio N/M (no-response ratio) of the total number of times N the response could not be received within the specified period from the transmission of each command to the total number of commands M transmitted from the HART modem 3 to the HART device 1. This allows the no-response ratio to be transmitted to the diagnostic device 2 for display.

Similarly, as described above, the specifying unit 23 of the diagnostic device 2 may be configured to transmit a device specifying signal to the HART modem 3 upon reception of a specification of the device to be connected from the user.

Upon reception of the device specifying signal via the communication interface unit 33, the connection target management unit 38 of the HART modem 3 permits execution of the processes in FIG. 11 and FIG. 12 only for the HART device 1 specified by the device specifying signal and does not permit the execution for the HART device 1 not specified by the device specifying signal (the number of times of no response and the no-response ratio are not to be measured).

In the present exemplary embodiment, the measurement results of the number of times of no response and the no-response ratio are transmitted to the diagnostic device 2. However, the present exemplary embodiment is not limited thereto, and the data management unit 32 of the HART modem 3 may be configured to display the measurement results on the status display unit 37.

Figure 13:
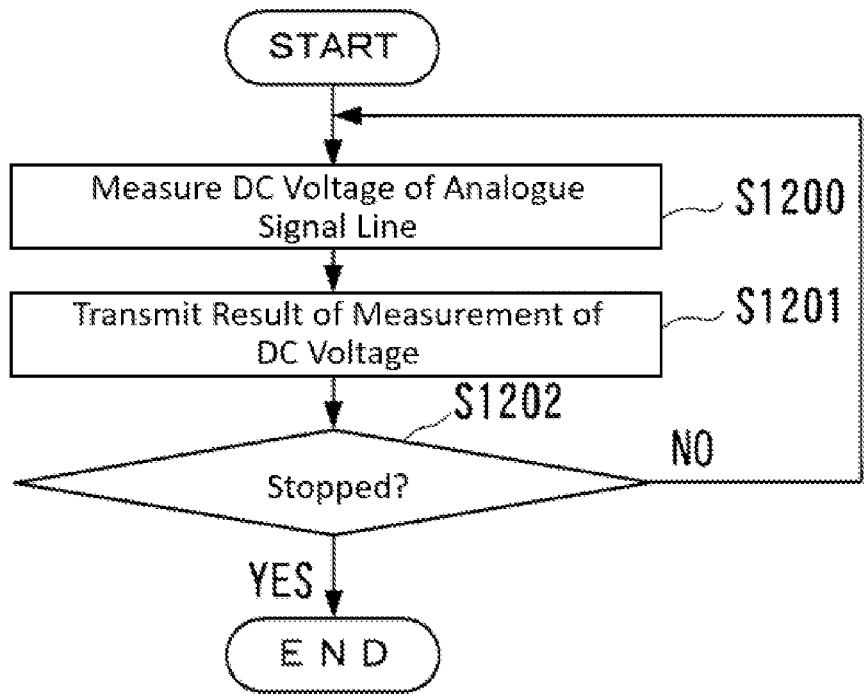
FIG. 13 is an explanatory flowchart describing a power supply state diagnostic function of the HART modem according to the exemplary embodiment of the present invention.
Figure 14:
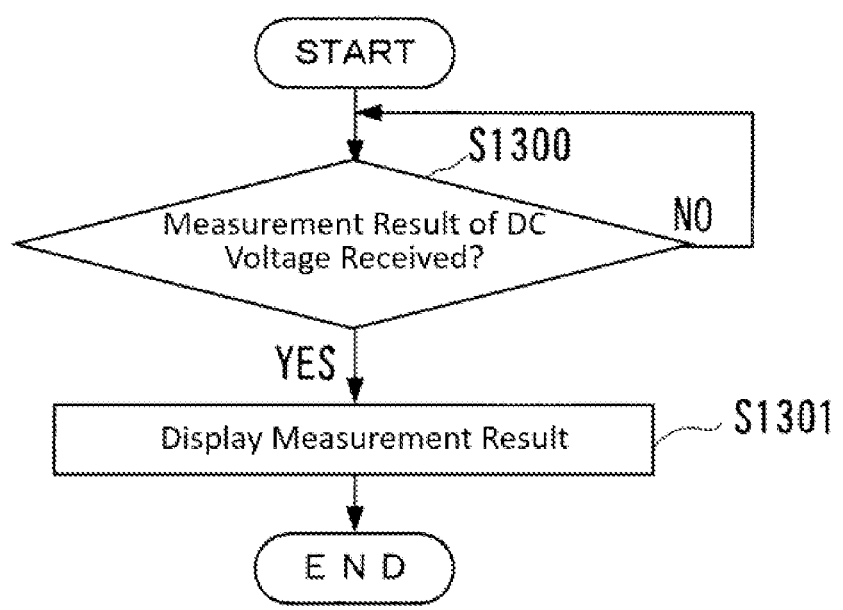
FIG. 14 is an explanatory flowchart describing a power supply state diagnostic function of the diagnostic device according to the exemplary embodiment of the present invention.

FIG. 13 is an explanatory flowchart describing a power supply state diagnostic function of the HART modem 3, and FIG. 14 is an explanatory flowchart describing a power supply state diagnostic function of the diagnostic device 2.

The power supply status confirmation unit 36 of the HART modem 3 measures the DC voltage between the analog signal lines 10 and 11 (step S1200 in FIG. 13).

The data management unit 32 passes the DC voltage measurement result by the power supply status confirmation unit 36 to the communication interface unit 33. The communication interface unit 33 transmits the received measurement results from the data management unit 32 to the diagnostic device 2 (step S1201 in FIG. 12).

Upon reception of the measurement result of the DC voltage from the HART modem 3 via the communication interface unit 20 (YES in step S1300 in FIG. 14), the display unit 21 of the diagnostic device 2 displays the received measurement result (step S1301 in FIG. 14).

In this manner, the DC voltage between the analog signal lines 10 and 11 can be confirmed by the diagnostic device 2, and the power supply status of the analog signal lines 10 and 11 can be confirmed.

The processes of FIG. 13 and FIG. 14 are started in response to a POWER SUPPLY STATE DIAGNOSIS START instruction signal output from the operation unit 24 operated by a user of the diagnostic device 2, for example. The POWER SUPPLY STATE DIAGNOSIS START instruction signal is transmitted via the communication interface unit 20 to the HART modem 3.

Also, the processes of FIG. 13 and FIG. 14 are stopped in response to a POWER SUPPLY STATE DIAGNOSIS STOP instruction signal output from the operation unit 24 operated by a user of the diagnostic device 2, for example. The POWER SUPPLY STATE DIAGNOSIS STOP instruction signal is transmitted via the communication interface unit 20 to the HART modem 3.

In the present exemplary embodiment, the DC voltage measurement results between the analog signal lines 10 and 11 are transmitted to the diagnostic device 2. However, the present exemplary embodiment is not limited thereto, and the data management unit 32 of the HART modem 3 may be configured to display the measurement results on the status display unit 37.

Figure 15:
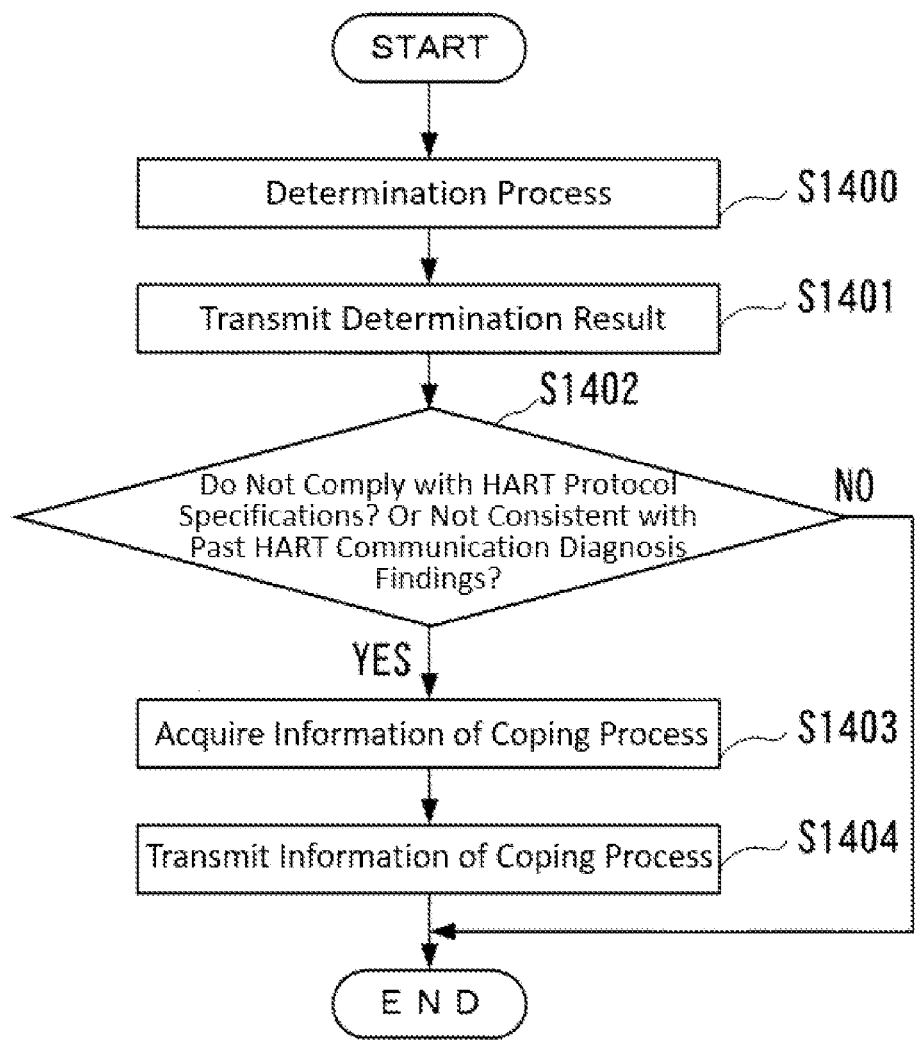
FIG. 15 is an explanatory flowchart describing a determination function of the HART modem according to the exemplary embodiment of the present invention.
Figure 16:
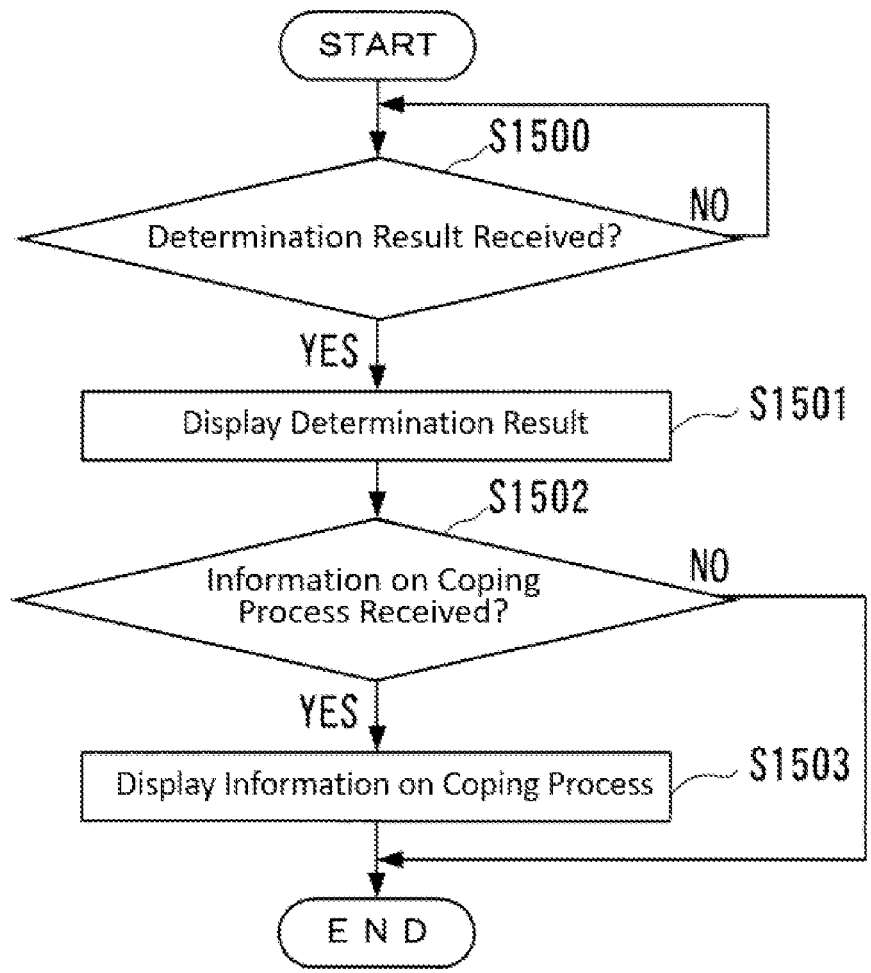
FIG. 16 is an explanatory flowchart describing a determination function of the diagnostic device according to the exemplary embodiment of the present invention.

FIG. 15 is an explanatory flowchart describing a determination function of the HART modem 3, and FIG. 16 is an explanatory flowchart describing a determination function of the diagnostic device 2.

Upon acquisition of the measurement results of the wave height value, the measurement results of the number of times of no response or the no-response ratio, and the measurement result of the DC voltage, the determination unit 43 of the HART modem 3 refers to the knowledge database 42 to determine whether the measurement results comply with the HART protocol specifications and whether the measurement results are consistent with the past HART communication diagnosis findings (step S1400 in FIG. 15).

In the knowledge database 42, information on the HART protocol specifications, the past HART communication diagnostics findings, and coping processes to be taken when the measurement results do not comply with the HART protocol specifications, or when the measurement results are not consistent with the past HART communication diagnosis findings are registered in advance.

The data management unit 32 passes the determination result of the determination unit 43 to the communication interface unit 33.

The communication interface unit 33 transmits the determination result received from the data management unit 32 to the diagnostic device 2 (step S1401 in FIG. 15).

Upon reception of the determination result from the HART modem 3 via the communication interface unit 20 (YES in step S1500 in FIG. 16), the display unit 21 of the diagnostic device 2 displays the received determination result (step S1501 in FIG. 16).

In this manner, whether the measurement results comply with the HART protocol specifications and whether the measurement results are consistent with the past HART communication diagnosis findings can be confirmed by the diagnostic device 2.

When the measurement results do not comply with the HART protocol specifications or the measurement results are not consistent with the past HART communication diagnosis findings (YES in step S1402 in FIG. 15), the instruction unit 44 of the HART modem 3 refers to the knowledge database 42 to acquire the information on the coping process for inconsistency with the HART protocol specifications or inconsistency with the past findings from the knowledge database 42 (step S1403 in FIG. 15).

The data management unit 32 passes the information on the coping process acquired by the instruction unit 44 to the communication interface unit 33. The communication interface unit 33 transmits the information on the coping process received from the data management unit 32 to the diagnostic device 2 (step S1404 in FIG. 15).

Upon reception of the information on the coping process from the HART modem 3 via the communication interface unit 20 (YES in step S1502 in FIG. 16), the display unit 21 of the diagnostic device 2 displays the received information on the coping process (step S1503 in FIG. 16).

In this manner, when the measurement results do not comply with the HART protocol specifications or when the measurement results are not consistent with the past HART communication diagnosis findings, the coping process can be confirmed by the diagnostic device 2.

The processes of FIG. 15 and FIG. 16 are started in response to a DETERMINATION START instruction signal output from the operation unit 24 operated by a user of the diagnostic device 2, for example.

The DETERMINATION START instruction signal is transmitted via the communication interface unit 20 to the HART modem 3.

Also, the processes of FIG. 15 and FIG. 16 are stopped in response to a DETERMINATION STOP instruction signal output from the operation unit 24 operated by a user of the diagnostic device 2, for example. The DETERMINATION STOP instruction signal is transmitted via the communication interface unit 20 to the HART modem 3.

Note that, in FIG. 2, the operation of the HART modem 3 relaying communication between the host device 5 and the HART device 1 is described, but in the present exemplary embodiment, the data management unit 32 can also generate commands for diagnosis. For example, the data management unit 32 may be configured to generate commands for diagnosis and pass it to the HART/Host communication conversion unit 31 upon reception of a WAVEFORM DISPLAY START instruction signal, an ANALYSIS START instruction signal, a RECORDING START instruction signal, a MEASUREMENT START instruction signal, a COMMUNICATION STATE DIAGNOSIS START instruction signal, or a POWER SUPPLY STATE DIAGNOSIS START instruction signal from the diagnostic device 2. Such commands for diagnosis are transmitted to the HART device 1 and the diagnostic device 2, similar to the command from the host device 5.

Of the configuration of the HART modem 3 described in the present exemplary embodiment, the software function of the HART communication unit 30, the software functions of the HART/Host communication conversion unit 31, the data management unit 32, and the communication interface unit 33, the software function of the communication waveform detection unit 34, the software function of the power supply status confirmation unit 36, and the software functions of the connection target management unit 38 and the record management unit 39 may be achieved by a computer provided with a Central Processing Unit (CPU), a storage device, and an interface, and a program that controls these hardware resources.

Figure 17:
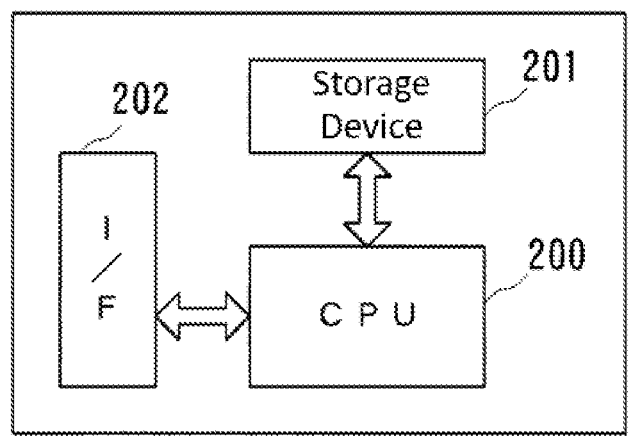
FIG. 17 is a block diagram illustrating a configuration example of a computer implementing the HART modem according to the exemplary embodiment of the present invention.

The configuration example of the computer is illustrated in FIG. 17.

The computer is provided with a CPU 200, a storage device 201, and an interface device (hereinafter referred to as I/F) 202.

The hardware of the HART communication unit 30, the hardware of the communication interface unit 33, the hardware of the communication waveform detection unit 34, the hardware of the power supply status confirmation unit 36, the hardware of the status display unit 37 and the record management unit 39 and the like are connected to the I/F 202.

In such the computer, a program for achieving the diagnostic method of the present invention is stored in the storage device 201. The CPU 200 executes the processes described in the present exemplary embodiment according to the program stored in the storage device 201.

Similarly, the software functions of the communication interface unit 20, the display unit 21, the communication protocol analysis unit 22, the specifying unit 23, the operation unit 24, and the communication waveform generation unit 25, among the configurations of the diagnostic device 2, can be achieved by a computer. The hardware of the communication interface unit 20, the display, etc. are connected to the I/F 202 of the computer. The CPU 200 of the diagnostic device 2 executes the processes described in the present exemplary embodiment according to the program stored in the storage device 201.

INDUSTRIAL APPLICABILITY

The present invention can be applied to HART communication.

REFERENCE SIGNS LIST

1 . . . HART device, 2 . . . diagnostic device, 3 . . . HART modem, 5 . . . host device, 20, 33 . . . communication interface unit, 21 . . . display unit, 22 . . . communication protocol analysis unit, 23 . . . specifying unit, 24 . . . operating unit, 25 . . . communication waveform generation unit, 30 . . . HART communication unit, 31 . . . HART/HOST communication conversion unit, 32 . . . data management unit, 34 . . . communication waveform detection unit, 36 . . . power supply status confirmation unit, 37 . . . status display unit, 38 . . . connection target management unit, 39 . . . record management unit, 40 . . . storage medium, 41 . . . slot, 42 . . . knowledge database, 43 . . . determination unit, 44 . . . instruction unit.

The invention claimed is:

1. A Highway Addressable Remote Transducer (HART) modem comprising: a communication conversion unit configured to relay communication between field equipment and a host device or a diagnostic device on a higher level; a data generation unit generating designated data from signals from HART communication transmitted and received to and from the field equipment; a communication interface unit configured to transmit the generated data to the diagnostic device and to receive, from the diagnostic device, a character string converted from a HART communication command transmitted to the field equipment and a response received from the field equipment; and a determination unit configured to refer to a knowledge database that stores HART protocol specifications and past HART communication diagnosis findings and to determine whether the measurement result complies with the HART protocol specifications and whether the measurement result is consistent with the past HART communication diagnosis findings; wherein the data generation unit comprises a waveform detection unit configured to generate data sampled from HART communication signals to be transmitted and received to and from the field equipment, the waveform detection unit is configured to measure a wave height value of the HART communication signals to be transmitted and received to and from the field equipment, and the communication interface unit transmits a determination result of the determination unit to the diagnostic device.

2. The HART modem according to claim 1, further comprising: a record management unit configured to record the data generated by the waveform detection unit to a storage medium mounted on the HART modem.

3. The HART modem according to claim 1, further comprising a display unit configured to display the measurement result.

4. The HART modem according to claim 1, further comprising an instruction unit configured to acquire information on a coping process for a situation when the measurement result does not comply with the HART protocol specifications or when the measurement result is not consistent with the past HART communication diagnosis findings from the knowledge database, wherein the communication interface unit transmits the information on the coping process acquired by the instruction unit to the diagnostic device.

5. A diagnostic system comprising: the HART modem according to claim 1; and the diagnostic device, wherein the diagnostic device comprises: a waveform generation unit configured to generate an image for displaying a signal waveform indicated by received data upon reception of the data transmitted from the HART modem; and a display unit configured to display the image generated by the waveform generation unit.

6. The HART modem according to claim 1, further comprising:
  a data management unit configured to measure a number of times of no response, which is a number of times the response from the field equipment cannot be received within a specified period from a transmission of the HART communication command to the field equipment, or a no-response ratio, which is a ratio of a total number of times the response cannot be received within the specified period from the transmission of each command to a total number of commands transmitted to the field equipment,
  wherein the communication interface unit transmits a measurement result of the data management unit to the diagnostic device.

7. The HART modem according to claim 6, further comprising
  a display unit configured to display the measurement result.

8. The HART modem according to claim 6, further comprising an instruction unit configured to acquire information on a coping process for a situation when the measurement result does not comply with the HART protocol specifications or when the measurement result is not consistent with the past HART communication diagnosis findings from the knowledge database, wherein the communication interface unit transmits the information on the coping process acquired by the instruction unit to the diagnostic device.

9. The HART modem according to claim 1, further comprising:
  a power supply status confirmation unit configured to measure a DC voltage of an analog signal line connecting the field equipment to the HART modem,
  wherein the communication interface unit transmits a measurement result of the power supply status confirmation unit to the diagnostic device.

10. The HART modem according to claim 9, further comprising
  a display unit configured to display the measurement result.

11. The HART modem according to claim 9, further comprising an instruction unit configured to acquire information on a coping process for a situation when the measurement result does not comply with the HART protocol specifications or when the measurement result is not consistent with the past HART communication diagnosis findings from the knowledge database, wherein the communication interface unit transmits the information on the coping process acquired by the instruction unit to the diagnostic device.

12. The HART modem according to claim 1, further comprising:
  a record management unit configured to record the HART communication command transmitted to the field equipment and the response received from the field equipment on a storage medium mounted to the HART modem.

13. A diagnostic system comprising:
  a diagnostic device; and
  a Highway Addressable Remote Transducer (HART) modem configured to relay communication between field equipment and a host device or the diagnostic device on a higher level;
wherein
  the HART modem comprises:
    a communication conversion unit configured to relay the communication between the field equipment and the host device or the diagnostic device; and
    a first communication interface unit configured to transmit a HART communication command transmitted to the field equipment and a response received from the field equipment to the diagnostic device,
and
  the diagnostic device comprises:
    a second communication interface unit configured to receive the HART communication command and the response transmitted from the HART modem; and
    a communication protocol analysis unit configured to convert the received command and response into a character string indicating contents of the received command and response.

14. The diagnostic system according to claim 13, wherein:
  the diagnostic device further comprises a display unit configured to display the character string obtained by the communication protocol analysis unit.

15. The diagnostic system according to claim 13, wherein:
  the second communication interface unit of the diagnostic device transmits the character string obtained by the communication protocol analysis unit to the HART modem, and the HART modem is configured to receive the character string transmitted from the diagnostic device and further comprises a record management unit configured to record the received character string on a storage medium mounted to the HART modem.

\* \* \* \* \*